US008650120B2

(12) United States Patent
Leyva et al.

(10) Patent No.: US 8,650,120 B2
(45) Date of Patent: Feb. 11, 2014

(54) SYSTEMS AND METHODS FOR ENHANCED AUTHORIZATION FRAUD MITIGATION

(75) Inventors: Marcel Leyva, Chandler, AZ (US); Houman Motaharian, Glen Rock, NJ (US); Robert Phelan, Mendham, NJ (US); Hing Seng Too, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 13/411,370

(22) Filed: Mar. 2, 2012

(65) Prior Publication Data

US 2013/0232069 A1 Sep. 5, 2013

Related U.S. Application Data

(63) Continuation of application No. 13/411,299, filed on Mar. 2, 2012.

(51) Int. Cl.
*G06Q 40/00* (2012.01)
(52) U.S. Cl.
USPC .............................................. 705/40; 705/35
(58) Field of Classification Search
USPC ...................................................... 705/40, 35
See application file for complete search history.

(56) References Cited

U.S. PATENT DOCUMENTS

| | | | |
|---|---|---|---|
| 5,648,647 A | 7/1997 | Seiler | |
| 5,812,668 A | 9/1998 | Weber | |
| 5,850,446 A | 12/1998 | Berger et al. | |
| 5,913,202 A | 6/1999 | Motoyama | |
| 5,949,045 A | 9/1999 | Ezawa et al. | |
| 5,996,076 A | 11/1999 | Rowney et al. | |
| 6,023,679 A | 2/2000 | Acebo et al. | |
| 6,029,154 A | 2/2000 | Pettitt | |
| 6,160,874 A | 12/2000 | Dickerman et al. | |
| 6,658,393 B1 | 12/2003 | Basch et al. | |
| 6,732,919 B2 | 5/2004 | Macklin et al. | |
| 6,926,203 B1 | 8/2005 | Sehr | |
| 6,999,943 B1 | 2/2006 | Johnson et al. | |
| 7,051,002 B2 | 5/2006 | Keresman et al. | |
| 7,136,835 B1 | 11/2006 | Flitcroft et al. | |

(Continued)

FOREIGN PATENT DOCUMENTS

WO 02099720 12/2012

OTHER PUBLICATIONS

Video Technology News; "Common Interface Conditional Access System Wins Crucial Support in Europe"; Jun. 5, 1995.*

(Continued)

*Primary Examiner* — Edward Chang
(74) *Attorney, Agent, or Firm* — Snell & Wilmer L.L.P.

(57) ABSTRACT

A consumer uses a web client to transmit purchase information associated with a transaction to a merchant server. The purchase information is transmitted via a web acceleration server. The web acceleration server identifies enhanced authorization data associated with the transaction. The web acceleration server creates a pseudo authorization message. The web acceleration server transmits the pseudo authorization message to a transaction account issuer. The merchant server transmits an authorization request to the transaction account issuer. The transaction account issuer determines that the authorization request and the pseudo authorization message are associated with the same transaction. The transaction account issuer merges the authorization request and the pseudo authorization message and performs a fraud analysis. The transaction account issuer transmits an authorization response to the merchant.

20 Claims, 6 Drawing Sheets

(56) References Cited

U.S. PATENT DOCUMENTS

| | | | |
|---|---|---|---|
| 7,331,518 B2 | 2/2008 | Rable | |
| 7,640,185 B1 | 12/2009 | Giordano et al. | |
| 7,904,332 B1 | 3/2011 | Merkley et al. | |
| 8,214,292 B2 | 7/2012 | Duggal et al. | |
| 2002/0035548 A1* | 3/2002 | Hogan et al. | 705/64 |
| 2002/0052852 A1 | 5/2002 | Bozeman | |
| 2002/0091554 A1 | 7/2002 | Burrows | |
| 2002/0174065 A1 | 11/2002 | Coward | |
| 2002/0188573 A1 | 12/2002 | Calhoun | |
| 2003/0061157 A1 | 3/2003 | Hirka et al. | |
| 2003/0105707 A1 | 6/2003 | Audebert et al. | |
| 2003/0120615 A1 | 6/2003 | Kuo | |
| 2003/0167226 A1 | 9/2003 | Britton et al. | |
| 2003/0225687 A1 | 12/2003 | Lawrence | |
| 2004/0167854 A1 | 8/2004 | Knowles et al. | |
| 2004/0232225 A1 | 11/2004 | Bishop et al. | |
| 2005/0108178 A1 | 5/2005 | York | |
| 2005/0240522 A1* | 10/2005 | Kranzley et al. | 705/40 |
| 2006/0026076 A1 | 2/2006 | Raymond | |
| 2006/0212387 A1 | 9/2006 | Jensen | |
| 2007/0192249 A1 | 8/2007 | Biffle et al. | |
| 2007/0215698 A1 | 9/2007 | Perry | |
| 2007/0282674 A1 | 12/2007 | Gomes | |
| 2007/0284433 A1 | 12/2007 | Domenica | |
| 2008/0275821 A1 | 11/2008 | Bishop et al. | |
| 2008/0314977 A1 | 12/2008 | Domenica | |
| 2009/0313134 A1 | 12/2009 | Faith et al. | |
| 2010/0100484 A1 | 4/2010 | Nguyen | |
| 2010/0257068 A1 | 10/2010 | Duggal | |

OTHER PUBLICATIONS

Information Technology Newsweekly; "Convergys Information Management Group, Inc.; Patent Issued for System and method for a Flexible Device-based Rating Engine"; Jul. 23, 2013.*
Office Action dated Nov. 29, 2012 in U.S. Appl. No. 13/411,299.
Advisory Action dated Jun. 28, 2013 in U.S. Appl. No. 13/411,299.
Final Office Action dated Apr. 19, 2013 in U.S. Appl. No. 13/411,299.
PCT; Int'l Search Report and Written Opinion for Appl. No. PCT/US05/04135 dated Feb. 28, 2006.
USPTO; Office Action for U.S. Appl. No. 11/303,018 dated Oct. 7, 2008.
USPTO; Final Office Action for U.S. Appl. No. 11/303,018 dated Apr. 29, 2009.
USPTO; Office Action for U.S. Appl. No. 11/303,018 dated Sep. 23, 2009.
USPTO; Final Office Action for U.S. Appl. No. 11/303,018 dated Jan. 21, 2010.
USPTO; Advisory Action for U.S. Appl. No. 11/303,018 dated Apr. 23, 2010.
USPTO; Office Action for U.S. Appl. No. 11/303,018 dated Jun. 21, 2010.
USPTO; Office Action for U.S. Appl. No. 10/588,811 dated Jun. 25, 2009.
USPTO; Final Office Action for U.S. Appl. No. 10/588,811 dated Jan. 6, 2010.
USPTO; Advisory Action for U.S. Appl. No. 10/588,811 dated Apr. 23, 2010.
USPTO; Office Action for U.S. Appl. No. 10/588,811 dated Aug. 31, 2010.
USPTO; Office Action for U.S. Appl. No. 12/205,412 dated Aug. 10, 2010.
Final Office Action dated May 8, 2012 in U.S. Appl. No. 10/588,811.
USPTO; Final Office Action dated Dec. 8, 2010 in U.S. Appl. No. 11/303,018.
USPTO; Office Action dated Apr. 12, 2011 in U.S. Appl. No. 11/303,018.
USPTO; Advisory Action dated Mar. 2, 2011 in U.S. Appl. No. 11/303,018.
USPTO; Office Action dated May 4, 2012 in U.S. Appl. No. 11/303,018.
PCT; International Preliminary Report on Patentability dated Sep. 25, 2006 in Application No. PCT/US2005/004135.
USPTO; Final Office Action dated Feb. 1, 2011 in U.S. Appl. No. 10/588,811.
USPTO; Advisory Action dated Apr. 26, 2011 in U.S. Appl. No. 10/588,811.
USPTO; Office Action dated Nov. 2, 2011 in U.S. Appl. No. 10/588,811.
USPTO; Office Action dated Mar. 16, 2012 in U.S. Appl. No. 12/874,063.
USPTO; Final Office Action dated Aug. 27, 2012 in U.S. Appl. No. 12/874,063.
USPTO; Office Action dated Apr. 11, 2007 in U.S. Appl. No. 11/448,767.
USPTO; Office Action dated Nov. 13, 2007 in U.S. Appl. No. 11/448,767.
USPTO; Final Office Action dated May 29, 2008 in U.S. Appl. No. 11/448,767.
USPTO; Advisory Action dated Nov. 15, 2011 in U.S. Appl. No. 12/416,680.
USPTO; Office Action dated Sep. 30, 2011 in U.S. Appl. No. 12/416,680.
USPTO; Office Action dated Mar. 28, 2011 in U.S. Appl. No. 12/416,680.
USPTO; Advisory Action dated Jul. 17, 2012 in U.S. Appl. No. 10/588,811.
USPTO; Office Action dated Jan. 24, 2011 in U.S. Appl. No. 12/205,412.
USPTO; Advisory Action dated Apr. 27, 2011 in U.S. Appl. No. 12/205,412.
USPTO; Office Action dated Aug. 2, 2010 in U.S. Appl. No. 12/416,675.
USPTO; Advisory Action dated Feb. 2, 2011 in U.S. Appl. No. 12/416,675.
USPTO; Office Action dated Sep. 22, 2011 in U.S. Appl. No. 12/416,675.
USPTO; Office Action dated Dec. 15, 2011 in U.S. Appl. No. 12/416,675.
USPTO; Office Action dated Aug. 16, 2010 in U.S. Appl. No. 11/448,767.
USPTO; Advisory Action dated Jun. 17, 2010 in U.S. Appl. No. 11/488,767.
USPTO; Final Office Action dated Apr. 8, 2010 in U.S. Appl. No. 11/448,767.
USPTO; Office Action dated Nov. 4, 2009 in U.S. Appl. No. 11/448,767.
USPTO; Advisory Action dated Aug. 3, 2009 in U.S. Appl. No. 11/448,767.
USPTO; Final Office Action dated Mar. 25, 2009 in U.S. Appl. No. 11/448,767.
USPTO; Office Action dated Oct. 20, 2008 in U.S. Appl. No. 11/488,767.

* cited by examiner

SYSTEMS AND METHODS FOR ENHANCED AUTHORIZATION FRAUD MITIGATION

CROSS REFERENCE TO RELATED APPLICATIONS

This application is a continuation of, and claims priority to U.S. application Ser. No. 13/411,299 entitled "Systems and Methods for Enhanced Authorization Fraud Mitigation" and filed Mar. 2, 2012. The above-listed application is incorporated herein by reference.

BACKGROUND

1. Field

The disclosure relates generally to systems and methods of authorizing transaction requests, and more specifically, to authorizing transaction requests using enhanced data.

2. Related Art

Transaction account issuers attempt to identify fraudulent authorization requests in order to reduce fraud. Traditionally a merchant submits an authorization request to the transaction account issuer. The authorization request usually contains information such as account number, expiration date, and transaction amount.

In more advanced systems, the merchant may receive, then submit additional information associated with the authorization request to the transaction account issuer. For example, the information may include an email address, a telephone number, or an address. This information may be used to better assess whether the transaction is fraudulent. However, many merchants lack the capability to automatically transmit the additional information. Therefore, certain information which could improve the identification of fraudulent purchases does not get sent to the account issuer.

SUMMARY

The present disclosure includes systems, methods, and articles of manufacture for authorization requests. The method may comprise receiving purchase information from a web client. The method may further comprise identifying enhanced authorization data associated with the purchase information. The method may comprise creating a pseudo authorization message. The pseudo authorization message may comprise a combination of the purchase information and the enhanced authorization data. The purchase information may be transmitted to a merchant server. The pseudo authorization message may be transmitted to a transaction account issuer. In various embodiments, the pseudo authorization message bypasses the merchant server.

In various embodiments, a method may include receiving an authorization request associated with a transaction from a merchant server. The method may further include receiving a pseudo authorization message associated with the transaction from a web acceleration server. The method may include merging the authorization request and the pseudo authorization message to create an enhanced authorization message. In various embodiments the pseudo authorization message may bypass the merchant server. In various embodiments, the method may include storing the pseudo authorization message in an enhanced authorization queue.

BRIEF DESCRIPTION OF THE DRAWINGS

The features and advantages of the present disclosure will become more apparent from the detailed description set forth below when taken in conjunction with the drawings. The left most digit of a reference number identifies the drawing in which the reference number first appears.

DETAILED DESCRIPTION

The detailed description of exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods, and articles of manufacture for authorizing transaction requests are disclosed. In general, a consumer may use a web client to transmit purchase information to a merchant. A web acceleration server may receive the purchase information from the web client and transmit the purchase information to the merchant along a first data path. The web acceleration server may receive enhanced authorization data from the web client and transmit a pseudo authorization message containing the enhanced authorization data to a transaction account issuer along a second data path. The pseudo authorization message may be transmitted to the transaction account issuer through an application program interface.

The merchant may receive the purchase information and create an authorization request containing data such as a transaction account number, expiration date, and purchase amount. The merchant may transmit the authorization request to the transaction account issuer.

The transaction account issuer may receive the pseudo authorization message from the web acceleration server. The transaction account issuer may receive the authorization request from the merchant. The transaction account issuer may compare the enhanced authorization data in the pseudo authorization message with previously stored fraud data to assess the risk of fraud associated with the pseudo authorization message. The transaction account issuer may determine that the pseudo authorization message and the authorization request are associated with the same transaction. The transaction account issuer may use information from the pseudo authorization request and the authorization request to determine whether to approve or deny the authorization request. The transaction account issuer may transmit an approval or denial message to the merchant, and the merchant may transmit an approval or denial message to the consumer.

Figure 1:
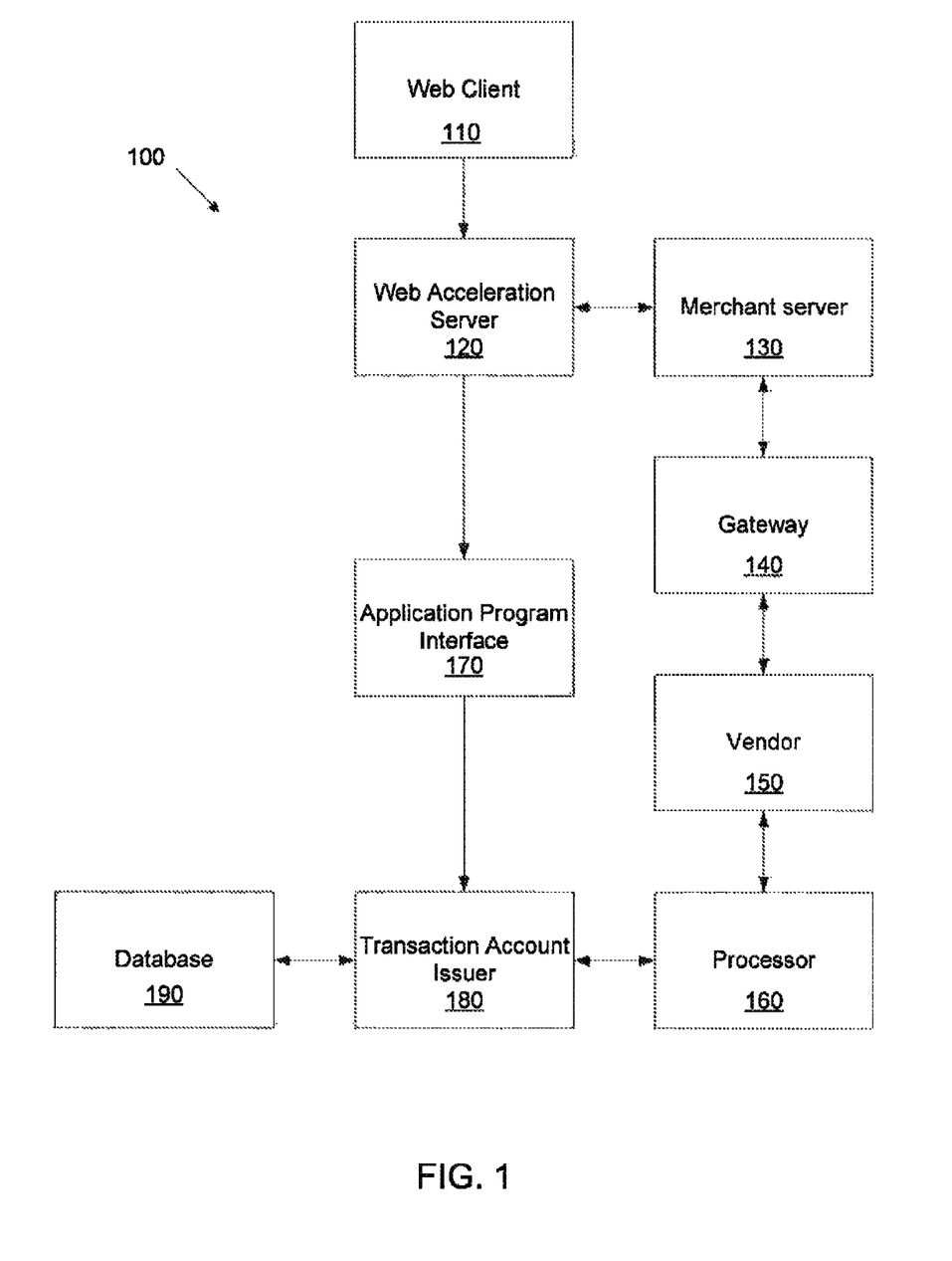
FIG. 1 illustrates a system diagram according to various embodiments.

Referring now to FIG. 1, an exemplary system 100 for authorizing transaction requests is illustrated according to various embodiments. System 100 may comprise a web client 110, a web acceleration server 120, a merchant server 130, a gateway 140, a vendor 150, a processor 160, an application program interface 170, a transaction account issuer server 180, and a database 190. Various system components may be connected through a network.

Web client 110 may include any device that allows a consumer to connect to a network. Web acceleration server 120 may include any hardware or software for storing or transmitting data. Web acceleration server 120 may be designed to identify an efficient data path between web client 110 and merchant server 130. Web acceleration server 120 may store or cache merchant website data such that the web client 110 may interact with a merchant website without communicating with merchant server 130. Merchant server 130 may include any hardware or software that operates a merchant website.

Gateway 140 may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Vendor 150 may include software, hardware and/or a solution provided from an external vendor (e.g., not part of the merchant) to provide value in the payment process (e.g., risk assessment).

Processor 160 may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

API 170 may be an interface implemented by a software program which enables the API to interact with other software. API 170 may include a programming language that enables communication between computer programs, such as programs of a merchant and programs of a financial institution and/or third party fraud prevention provider programs. API 170 may be implemented by applications, libraries, and operating systems to determine vocabularies and calling conventions, and may be used to access services associated therewith. API 170 may include specifications for routines, data structures, object classes, and protocols for communication. API 170 may describe the ways in which a particular task is performed. API 170 may define a set of request messages, along with a definition of the structure of response messages. API 170 may be a backward compatible API. In some cases API 170 may replace the need for and/or supplement middleware.

API 170 may be used by more than one high-level programming language. Thus, API 170 may facilitate automatically mapping to features (syntactic or semantic). This may be known as language binding, and is itself may be an API. Data fed to API 170 may be automatically captured during the processing of a transaction, entered, and/or provided by a database (e.g., a merchant database, financial institution database and/or third-party database.)

The API 170 may be provided by the financial institution. Access to the API programming may be granted to one or more of the merchant, the financial institution and/or a third party. The API 170 may be provided with or without supporting documentation.

Transaction account issuer 180 may include any hardware or software for authorizing transaction requests and/or performing fraud assessment. Transaction account issuer 180 may be operated by a financial institution which issues transaction accounts. However, in various embodiments transaction account issuer 180 is operated by a third party. Database 190 may be any database or combination of databases that stores information related to fraud or fraud potential.

Referring now to FIGS. 2-5, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1.

Figure 2:
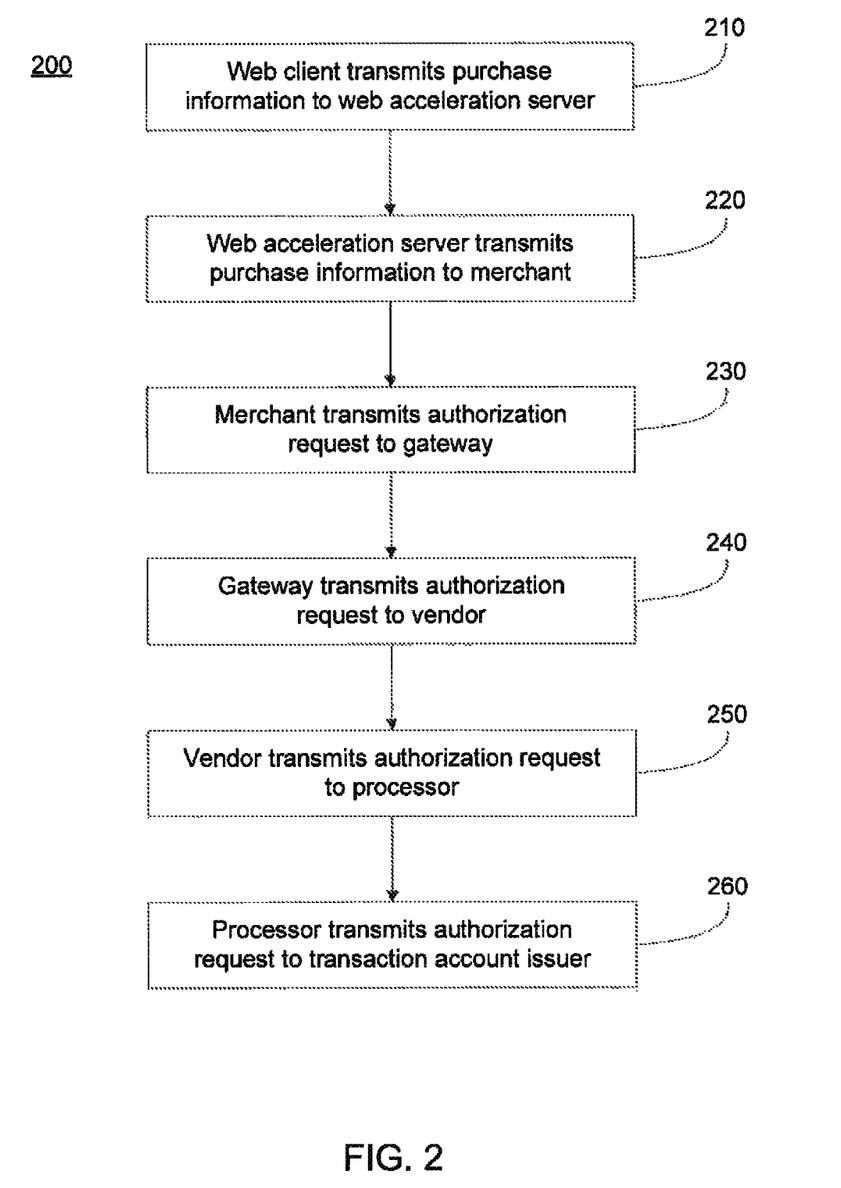
FIG. 2 illustrates a flowchart depicting a process for transmitting an authorization request according to various embodiments.

Referring to FIG. 2, a process 200 for transmitting an authorization request is illustrated according to various embodiments. A consumer may open a web browser on the web client 110 and access a merchant website. The website may be cached on the web acceleration server 120. Thus, in various embodiments, while browsing through the merchant website, the web client 110 may not be communicating with the merchant server 130, but rather communicating with the web acceleration server 120.

At some point the consumer may decide to make a purchase of goods or services from the merchant. The consumer may input purchase information into the website. For example, in various embodiments the purchase information may include a transaction account number, a transaction account issuer, an expiration date, a security code, a billing address, a consumer name, a consumer birth date, a shipping address, a ship-to-name, a shipping method, an email address, a telephone number, and/or a description of the goods or services being purchased. In step 210, the web client may transmit the purchase information to the web acceleration server 120.

The purchase information may be entered into the website. In step 220, the web acceleration server 120 may transmit the purchase information to the merchant server 130. The merchant server 130 may assemble various elements of the purchase information into an authorization request. In various embodiments the authorization request may comprise the transaction account number, the expiration date, and the billing address. However, the authorization request may comprise any combination of the purchase information and/or additional information added by the merchant server 130.

In various embodiments, the authorization request for a transaction may be communicated from the merchant server 130 to the transaction account issuer 180 and/or an authorization system through at least one of gateway 140, vendor 150, or processor 160. In step 230, the merchant server 130 may transmit the authorization request to the gateway 140. In step 240, the gateway 140 may transmit the authorization request to the vendor 150. In step 250 the vendor 150 may transmit the authorization request to the processor 160. In step 260 the processor 160 may transmit the authorization request to the transaction account issuer 180. Though not depicted, multiple gateways 140, vendors 150 and processors 160 may be utilized in communicating between a merchant server 130 and a transaction account issuer 180. Moreover, (though not specifically depicted) one or more gateway 140, vendor 150 and processor 160 may be removed from any communications path described herein.

Figure 3:
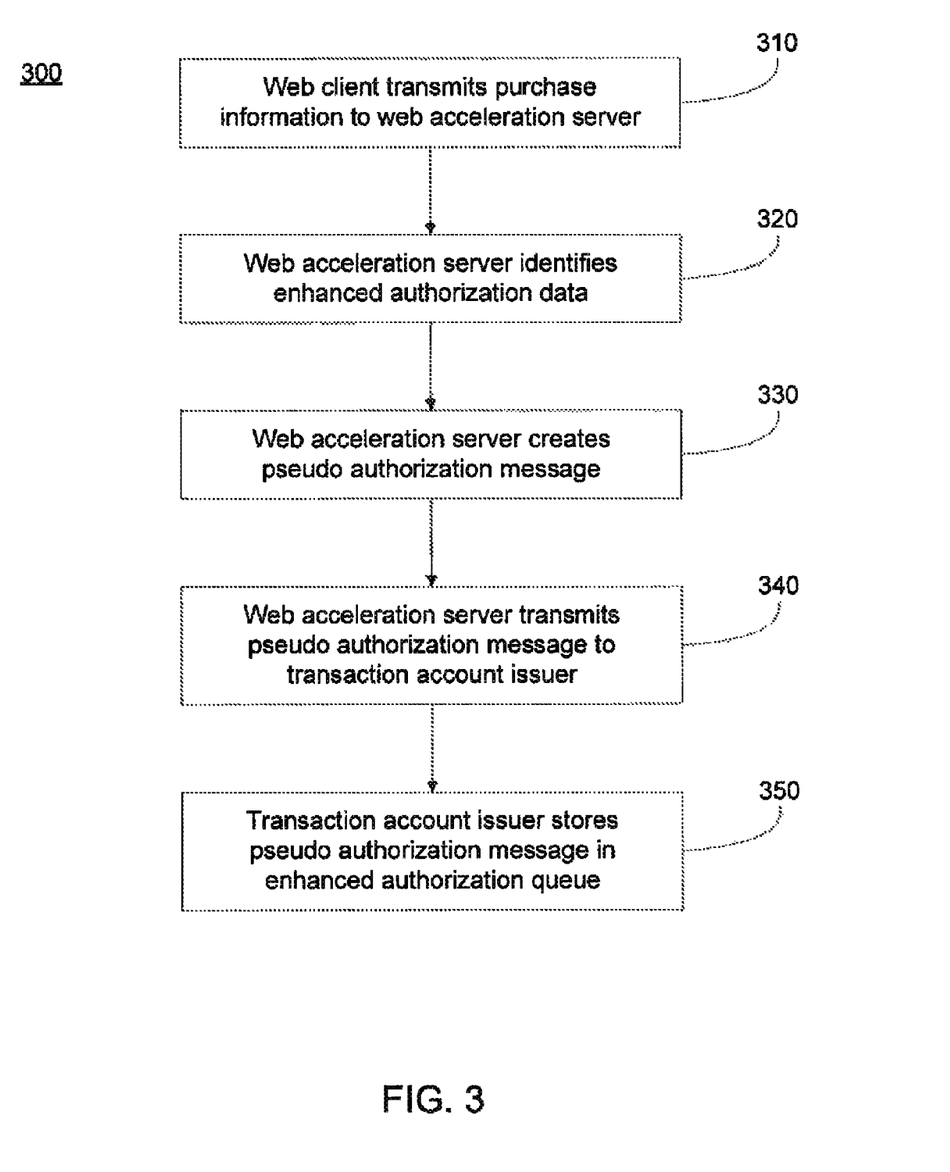
FIG. 3 illustrates a flowchart depicting a process for transmitting a pseudo authorization message according to various embodiments.

Referring to FIG. 3, a process 300 for transmitting a pseudo authorization message is illustrated according to various embodiments. In step 310, the web client 110 may transmit the purchase information to the web acceleration server 120. In step 320, the web acceleration server 120 may identify enhanced authorization data. The web acceleration server 120 may be in the process of receiving and transmitting data in a data stream. The web acceleration server 120 may recognize that data within the data stream is related to a transaction. In various embodiments the web acceleration server 120 may determine that the merchant participates in an enhanced authorization program. The web acceleration server 120 may store the data associated with the transaction. The purchase information may be the same purchase information as described with reference to FIG. 2. The enhanced authorization data may comprise any of the purchase information input by the consumer. Additionally, the enhanced authorization data may comprise data captured by the web acceleration server 120. For example, the web acceleration server may capture an IP address of the web client 110, a time of the purchase request, a merchant identifier number, a customer hostname, HTTP browser type, and/or a description of the goods or services. In various embodiments the merchant server 130 may be incapable of receiving, processing, or transmitting the enhanced authorization data. The web acceleration server 120 or transaction account issuer 180 may determine that the merchant server 130 is incapable of receiving, processing, or transmitting the enhanced authorization data.

In step 330, the web acceleration server 120 may create a pseudo authorization message. The pseudo authorization message may contain some of the same information as the authorization request described with reference to FIG. 2. For example, in various embodiments the pseudo authorization message may comprise the transaction account number, the expiration date, and the billing address. However, the pseudo authorization message may comprise additional data which was not contained in the authorization request. For example, in various embodiments the pseudo authorization message may comprise any combination of the purchase information and the enhanced authorization data identified by the web acceleration server 120. In various embodiments the web acceleration server may append a time stamp to the pseudo authorization message.

In step 340, the web acceleration server 120 may transmit the pseudo authorization message to the transaction account issuer 180. In various embodiments, the pseudo authorization message bypasses the merchant server 130, the gateway 140, the vendor 150, and the processor 160. Thus, the merchant server 130 may not ever need to process or be aware of the pseudo authorization message. In various embodiments the pseudo authorization message is transmitted to the transaction account issuer 180 through an application program interface (API) 170.

In step 350, the transaction account issuer 180 may receive the pseudo authorization message. In various embodiments the transaction account issuer 180 may match the pseudo authorization message with a corresponding authorization request. In various embodiments the transaction account issuer 180 may store the pseudo authorization message in an enhanced authorization queue.

Figure 4:
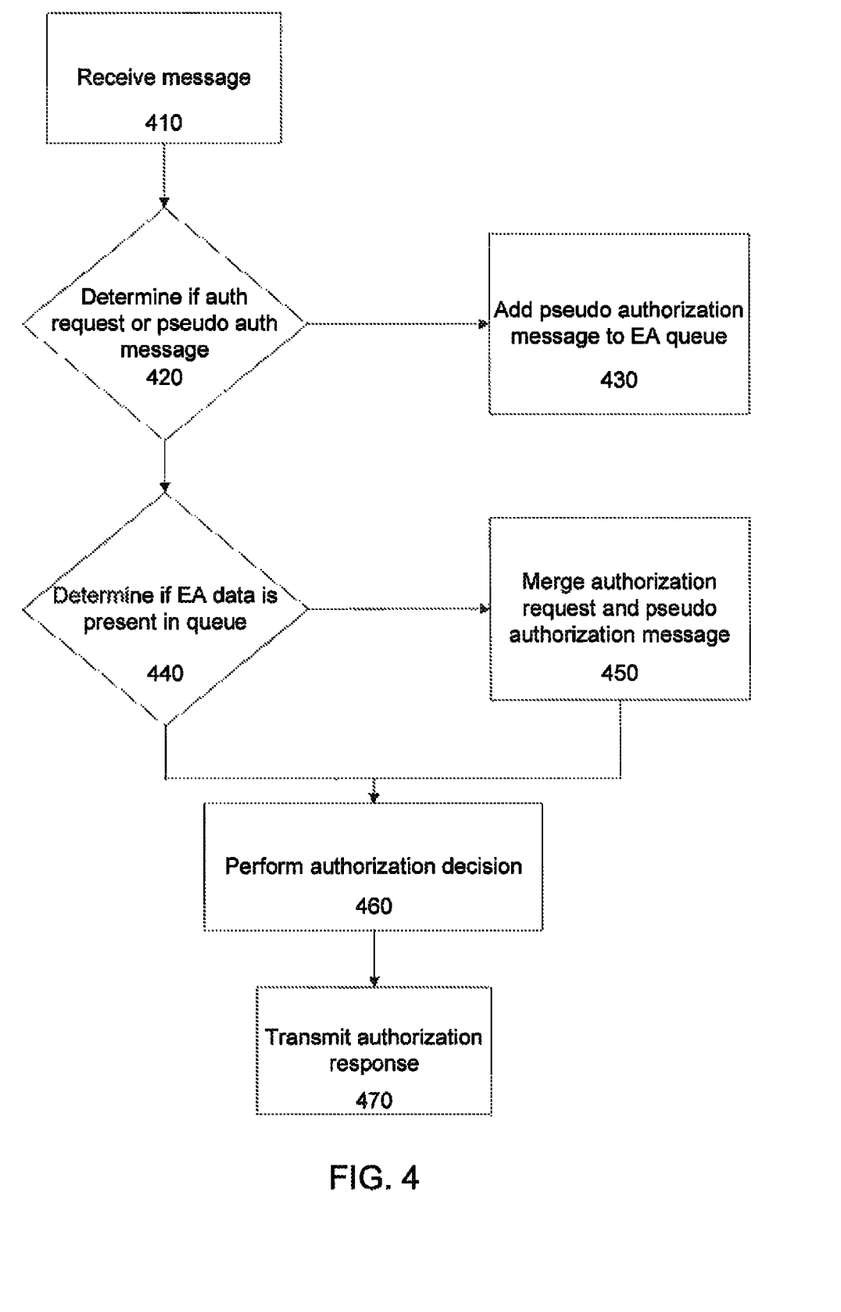
FIG. 4 illustrates a flowchart depicting a process for performing risk assessment according to various embodiments.

Referring to FIG. 4, a process for performing risk assessment is illustrated according to various embodiments. In step 410, in various embodiments, the transaction account issuer 180 may receive a message. In step 420, the transaction account issuer 180 may determine whether the message is an authorization request or a pseudo authorization message. In various embodiments, in response to determining that the message is a pseudo authorization message, the transaction account issuer 180 may store the pseudo authorization message in an enhanced authorization queue. In various embodiments, in response to determining that the message is a pseudo authorization message, the transaction account issuer 180 may check for a corresponding authorization request.

In various embodiments, the transaction account issuer 180 may determine that the message is an authorization request. The transaction account issuer 180 may determine whether a merchant associated with the authorization request participates in the digital gateway fraud mitigation system. The transaction account issuer 180 may poll the enhanced authorization queue in order to match a pseudo authorization message with a corresponding authorization request. The transaction account issuer 180 may not locate a corresponding pseudo authorization message in the enhanced authorization queue, and the transaction account issuer 180 may proceed to perform an authorization decision based on the information contained in the authorization request.

In various embodiments, the transaction account issuer 180 locates a pseudo authorization message in the enhanced authorization queue corresponding to the authorization request in step 440. In step 450, the transaction account issuer 180 may merge the authorization request and the pseudo authorization message in order to create an enhanced authorization message.

In step 460, the transaction account issuer 180 may perform an authorization decision. In various embodiments, the transaction account issuer 180 may compare the data in the enhanced authorization message with data in database 190. For example, the data in database 190 may indicate that the IP address associated with the enhanced authorization message has been used to commit fraud in the past. In various embodiments, the database may contain data associated with any of the information in the enhanced authorization message indicating positive or negative fraud risks associated with the transaction. The transaction account issuer 180 may use the information in the database 190 in determining whether to approve or decline the authorization request.

In step 470, the transaction account issuer 180 may transmit an authorization response indicating an approval or denial of the authorization request. In various embodiments the authorization response is transmitted to the merchant server 130 through at least one of the gateway 140, vendor 150, or processor 160. In various embodiments the authorization response is transmitted to the merchant server 130 through the API 170.

Figure 5:
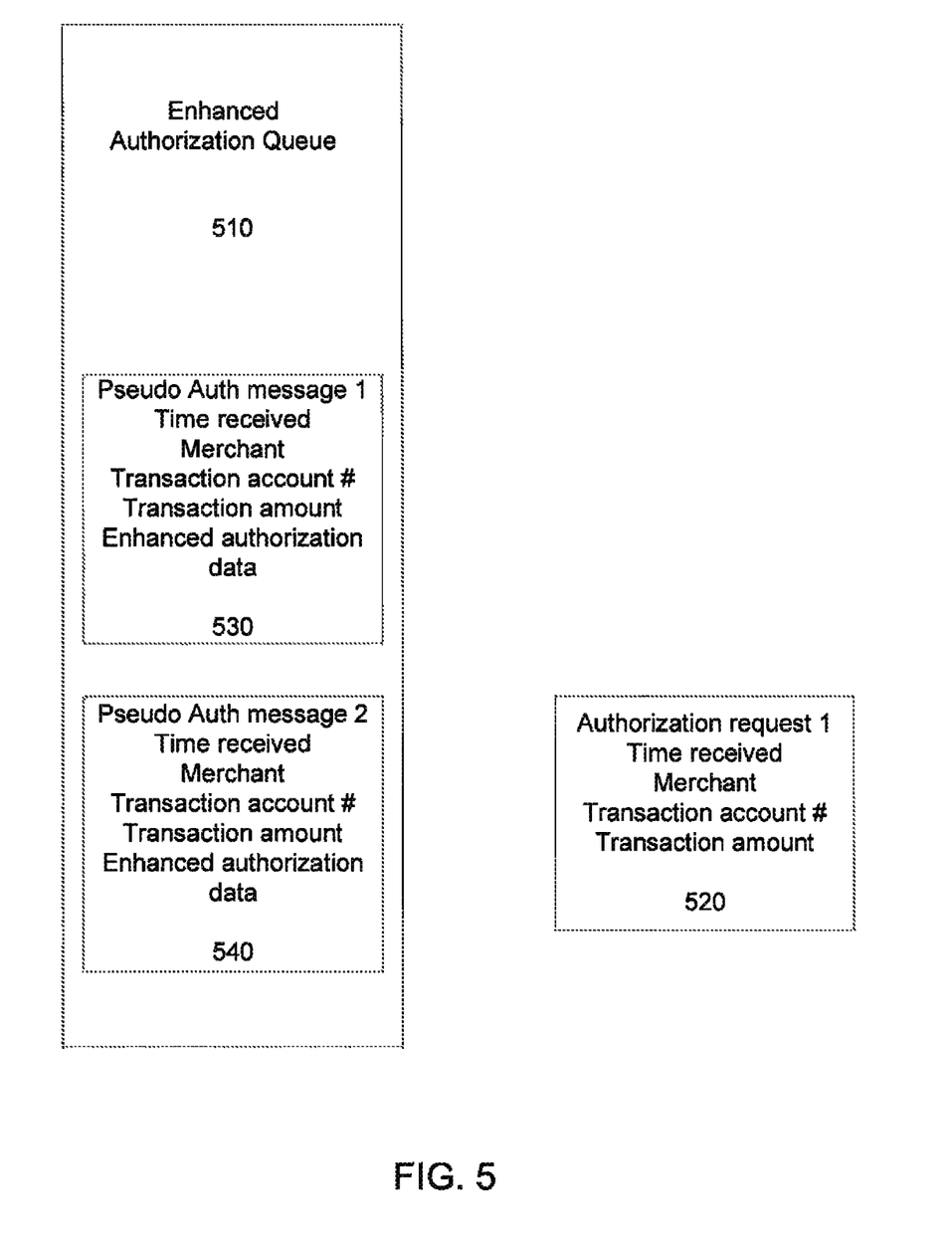
FIG. 5 illustrates an authorization request and an enhanced authorization queue according to various embodiments.

Referring to FIG. 5, an example of matching an authorization request to a pseudo authorization message is illustrated according to various embodiments. Transaction account issuer 180 may poll enhanced authorization queue 510 for a pseudo authorization message corresponding to authorization request 520. In various embodiments the transaction account issuer 180 may compare fields such as time received, a merchant associated with the message, a transaction account number or a transaction amount of the authorization request with similar fields of a pseudo authorization message in the enhanced authorization queue 510. In various embodiments transaction account issuer 180 may compare any data associated with the authorization request with data in the pseudo authorization messages. For example, transaction account issuer 180 may determine that the time received of authorization request 520 is not within a specified amount of the time received of pseudo authorization message 530 and determine that pseudo authorization message 530 does not correspond to authorization request 520. In various embodiments, transaction account issuer 180 may determine that the data associated with authorization request 520 is sufficiently similar to the data associated with pseudo authorization message 540 and determine that authorization request 520 and pseudo authorization message 540 correspond to the same transaction. In various embodiments transaction account issuer 180 merges the data of authorization request 520 and pseudo authorization message 540 to create an enhanced authorization message. Transaction account issuer 180 may use the enhanced authorization message to determine whether to approve or deny the authorization request. In various embodiments transaction account issuer 180 may remove the enhanced data prior to transmitting an authorization response to the merchant server 130.

The authorization request or the pseudo authorization message may include a request for fraud services. The terms and phase "a request for fraud services" may be a traditional request. A request for services may also describe sending additional information captured during a transaction which software, hardware, third party, and/or transaction account issuer 180 may use in association with a fraud assessment.

In various embodiments, a request for fraud services may include transmitting enhanced authorization data and/or utilizing fraud tools and/or customer level data as disclosed in pending U.S. patent application Ser. No. 12/874,063, entitled, "Application Program Interface Based Fraud Mitigation," filed Sep. 1, 2010; U.S. patent application Ser. No. 11/303,018, entitled "System, Method And Computer Program Product For Authorizing Transactions Using Enhanced Authorization Data," filed Dec. 16, 2005; U.S. application Ser. No. 10/588,811, entitled "System And Method Using Enhanced Authorization Data To Reduce Travel Related Transaction Fraud," filed Jun. 11, 2007; and U.S. application Ser. No. 12/205,412, entitled "Method, System, And Computer Program Product For Customer-Level Data Verification," filed Sep. 5, 2008, the contents of all documents are hereby incorporated by reference for any purpose in their entirety. For instance, a fraud mitigation tool and/or request for fraud services may include a data element (i.e. information that may be known by a financial transaction instrument issuer and/or the customer having a financial transaction instrument issued by the financial transaction instrument issuer as the enhanced authorization data, such as a whole or partial national identification number and/or whole or partial date of birth).

In various embodiments, a fraud mitigation tool and/or request for fraud services may include receiving enhanced authorization data. This enhanced authorization data may be sent in concert with an authorization request in an appended authorization request and/or in a separate request by an API such as API 170. The enhanced authorization data may include at least one of an automatic number identification and an information identifier. The enhanced authorization data may include at least one of an email address; a contact telephone number; a ship-to-name; a ship-to-address; an Internet Protocol (IP) address; and/or seller identification information. The enhanced authorization data may include at least one of an entity name; passenger name; a national identification code associated with a particular country (such as a social security number), date of birth, a travel date; a routing description; an electronic ticket indicator; an origin city; a destination city; a class of service; a number of passengers; a reservation code; and/or carrier code. The enhanced authorization data may be provided in whole or in part, for instance providing only the last four digits of a social security number. In one embodiment, when a partial enhanced authorization data entry is provided, a computer based system may compare the partial entry against a database record for the associated entity and retrieve the complete enhanced authorization data record.

In various embodiments, a fraud mitigation tool and/or request for fraud services may include receiving (from the merchant for use in real-time authorization) transaction variables for a transaction involving a purchase of a travel ticket using the financial account such as by API 170. The transaction variables may include at least one of a passenger name on the travel ticket, a travel date, a routing description of the travel ticket, and/or an electronic ticket indicator; and processing the transaction variables through a fraud-risk model to determine a risk factor for the transaction. The transaction authorization request may be approved based on the risk factor being within a range of acceptable values. A purchasing history of the account holder may be retrieved from a database. The transaction authorization request may be approved based on the risk factor and the purchasing history. In one embodiment, a status of the transaction account may be retrieved. The transaction authorization request may be approved based on the risk factor and the status. The transaction authorization request may be declined in response to the risk factor being within a range of unacceptable values.

In various embodiments, the fraud mitigation tool and/or request for fraud services may include receiving a first data element including first transaction account data identifying a first transaction account, and receiving a second data element. An entity may be determined from the first transaction account data. A second transaction account associated with the entity may be identified. A determination that the second data element does not match a corresponding data element associated with the first transaction account may be made. The second data element may be compared with an entity record including second transaction account data identifying the second transaction account. The second transaction account data may be compared with the first transaction account data. A comparison result may be generated to verify the first data element based on the comparing. The comparison result may indicate that the entity is associated with an account corresponding to the first transaction account.

In various embodiments, this request for fraud services may include transmitting information associated with products involved with the transaction to identify risk associated with the transaction as disclosed in pending U.S. patent application Ser. No. 12/416,675, entitled "Authorization Request For Financial Transactions," filed Apr. 1, 2009; the contents of which are hereby incorporated by reference for any purpose in their entirety. For instance, a fraud mitigation tool and/or request for fraud services may include automatically identifying at least one product from a purchase order associated with the transaction, the identification being performed based on an electronic comparison between a predefined list of products and the purchase order. A fraud mitigation tool and/or request for fraud services may include sending product details of the product through a third party (such as with an authorization request) and/or by API 170 to the financial institution. In this embodiment a notification may be received from the financial institution, by API 170 and/or through a third party, wherein the notification includes an authorization decision based on the product details. In this embodiment, the predefined list of products may be defined by the financial institution and/or transaction account issuer 180. The predefined list of products may be defined based on financial risk associated with a plurality of products. A unique code may be associated with each product in the predefined list of products. The unique code associated may be defined by the financial institution and/or transaction account issuer 180 and may be included as a field in the electronic transaction authorization request and/or sent separately by API 170.

In various embodiments, a request for fraud services may include transmitting a post-authorization message for a financial transaction as disclosed in pending U.S. patent application Ser. No. 12/416,6880, entitled "Post-Authorization Message For A Financial Transaction," filed Apr. 1, 2009 the contents of which are hereby incorporated by reference for any purpose in their entirety. For instance, a post-authorization message may be sent from a merchant 130 to a transaction account issuer 180 directly by API 170 or through one or more of a gateway 140, vendor 150 and/or processor 160 coupled to API 170. For instance, post authorization data may be electronically transmitted through at least one of a third party or an application program interface. In this embodiment, an assessment of the feasibility of the financial transaction may be made, such as by the merchant. The financial transaction is processed based at least in part on the feasibility assessment. The financial institution and/or transaction account issuer 180 is provided with an electronic post-authorization message through a third party and/or by an API. The electronic post-authorization message may comprise details related to the processing of the financial transaction including information related to the feasibility assessment.

Figure 6:
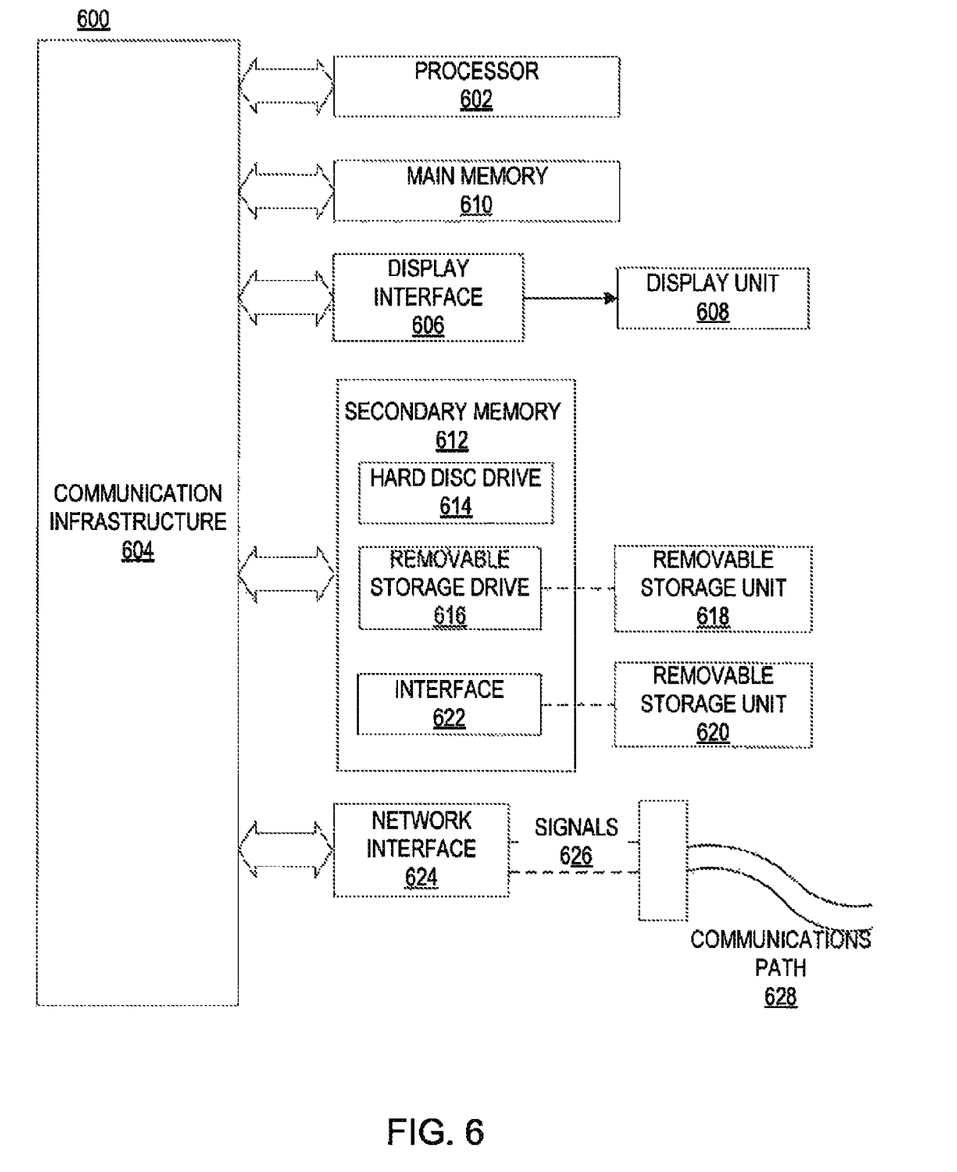
FIG. 6 illustrates a block diagram of an exemplary computer based system for implementing portions, according to various embodiments.

In one embodiment, the invention is directed toward one or more computer systems capable of carrying out the functionality described herein. An example of a computer system 600 is shown in FIG. 6.

Computer system 600 includes one or more processors 602. Processor 602 is connected to a communication infrastructure 604 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures. Computer system 600 can include a display interface 606 that forwards graphics, text, and other data from communication infrastructure 604 (or from a frame buffer not shown) for display on display unit 608.

Computer system 600 also includes a main memory 610, preferably random access memory (RAM), and may also include a secondary memory 612. Secondary memory 612 may include, for example, a hard disk drive 614 and/or a removable storage drive 616, representing a floppy disk drive, a magnetic tape drive, an optical disk drive, an information storage device, etc. Removable storage drive 616 reads from and/or writes to a removable storage unit 618. Removable storage unit 618 represents a floppy disk, a magnetic tape, an optical disk, etc. which is read by, and written to, by removable storage drive 616. Removable storage unit 618 includes a computer usable storage medium having stored therein computer software and/or data.

In alternative embodiments, secondary memory 612 may include other similar devices for allowing computer programs or other instructions to be loaded into computer system 600. Such devices may include, for example, removable storage unit 618, 620 and an interface 622. Examples of secondary memory 612 include a program cartridge and cartridge interface, a removable memory chip (such as an erasable programmable read only memory (EPROM), and/or programmable read only memory (PROM)) with an associated socket, and removable storage unit 618, 620 and/or interface 622, which allow software and data to be transferred from removable storage unit 618, 620 to computer system 600.

Computer system 600 may also include a communications interface, such as a network interface 624. Network interface 624 allows software and data to be transferred between computer system 600 and an external device. Examples of communications interface may include a modem, a network interface (such as an Ethernet card), a communications port, a Personal Computer Memory Card International Association (PCMCIA) slot and card, etc. Software and data transferred via the communications interface are in the form of signals 626 which may be electronic, electromagnetic, optical or other signals capable of being received by the communications interface. These signals are provided to the communications interface via a communications path (e.g., channel) 628. Communications path 628 carries signals 626 and may be implemented using wire or cable, fiber optics, a telephone line, a cellular link, a radio frequency (RF) link, and/or other communications channels.

In this document, the terms "computer program medium" and "computer usable medium" are used to generally refer to media such as removable storage drive such as a hard disk installed in hard disk drive 614, and signals 626. These computer program products provide software to computer system 600. The invention is directed to such computer program products.

Computer programs (also referred to as computer control logic) are stored in main memory 610 and/or secondary memory 612. Computer programs may also be received via the communications interface. Such computer programs, when executed, enable computer system 600 to perform the features, as discussed herein. In particular, the computer programs, when executed, enable processor 602 to perform the features. Accordingly, such computer programs represent controllers of computer system 600.

In an embodiment where the invention is implemented using software, the software may be stored in a computer program product and loaded into computer system 600 using removable storage drive 616, hard drive 614 or network interface 624. The control logic (software), when executed by processor 602, causes processor 602 to perform the functions of the invention as described herein.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/EC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Servever database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well knaown in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (fonrmerly MQSeries) by IBM, Inc. (Armonk, N.Y.) is an example of a commercially available middleware product. An Enterprise Service Bus ("ESB") application is another example of middleware.

The system and method may be described herein in terms of functional block components, screen shots, optional selections and various processing steps, it should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security Principles & Practice" by William Stallings, published by Prentice Hall; all of which are hereby incorporated by reference.

As used herein, the term "end user", "consumer", "customer", "cardmember", or "business" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this, example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method comprising:
   receiving, by a computer-based system for authorizing transaction requests, an authorization request associated with a transaction from a merchant server;
   receiving, by the computer-based system, a pseudo authorization message associated with the transaction from a web acceleration server, wherein the pseudo authorization message bypasses the merchant server;
   determining, by the computer-based system, that the authorization request was received within a specified time of the pseudo authorization message; and
   merging, by the computer-based system, the authorization request and the pseudo authorization message to create an enhanced authorization message.

2. The method of claim 1, wherein the pseudo authorization message is created by the web acceleration server.

3. The method of claim 1, further comprising determining, by the computer-based system, that the authorization request and the pseudo authorization message are associated with the transaction.

4. The method of claim 1, further comprising comparing, by the computer-based system, the enhanced authorization message with fraud data in a database.

5. The method of claim 1, further comprising transmitting, by the computer-based system, an authorization response to the merchant server.

6. The method of claim 1, wherein the authorization response comprises an approval or a denial.

7. The method of claim 1, further comprising storing, by the computer-based system, the pseudo authorization message in an enhanced authorization queue.

8. The method of claim 7, further comprising determining, by the computer-based system, that the pseudo authorization message has not been merged with an authorization request for a predetermined period of time.

9. The method of claim 8, further comprising removing, by the computer-based system, the pseudo authorization message from the enhanced authorization queue.

10. The method of claim 1, further comprising polling, by the computer-based system, an enhanced authorization queue for a pseudo authorization message corresponding to the authorization request.

11. The method of claim 1, further comprising polling, by the computer-based system and in response to receiving the pseudo authorization message, a database for a corresponding authorization request.

12. The method of claim 1, further comprising determining, by the computer-based system, that the merchant participates in an enhanced authorization program.

13. The method of claim 4, wherein the comparing comprises comparing at least one of a time received, a merchant, a transaction account number, and a transaction amount.

14. The method of claim 1, further comprising determining, by the computer-based system, that information in the enhanced authorization message is associated with fraudulent activity.

15. The method of claim 1, wherein the pseudo authorization message comprises a combination of purchase information and enhanced authorization data.

16. The method of claim 1, wherein the merchant server is incapable of processing enhanced authorization data.

17. The method of claim 1, wherein the pseudo authorization message comprises at least one of a transaction account number, a transaction account issuer, an expiration date, a security code, a billing address, a consumer name, a consumer birth date, a shipping address, a ship-to-name, a shipping method, an email address, a telephone number, an IP address, a service establishment number, a time of the purchase request, a customer hostname, N HTTP browser type, and a description of the goods.

18. The method of claim 1, further comprising appending, by the computer-based system, a time stamp to the pseudo authorization message.

19. An article of manufacture including a non-transitory, tangible computer readable storage medium having instructions stored thereon that, in response to execution by a computer-based system for authorizing transaction requests, cause the computer-based system to perform operations comprising:
   receiving, by the computer-based system, an authorization request associated with a transaction from a merchant server;
   receiving, by the computer-based system, a pseudo authorization message associated with the transaction from a web acceleration server, wherein the pseudo authorization message bypasses the merchant server;
   determining, by the computer-based system, that the authorization request was received within a specified time of the pseudo authorization message; and
   merging, by the computer-based system, the authorization request and the pseudo authorization message to create an enhanced authorization message.

20. A system comprising;
   a processor for authorizing transaction requests,
   a tangible, non-transitory memory configured to communicate with the processor,
   the tangible, non-transitory memory having instructions stored thereon that, in response to execution by the processor, cause the processor to perform operations comprising:
      receiving, by the processor, an authorization request associated with a transaction from a merchant server;
      receiving, by the processor, a pseudo authorization message associated with the transaction from a web acceleration server, wherein the pseudo authorization message bypasses the merchant server;
      determining, by the computer-based system, that the authorization request was received within a specified time of the pseudo authorization message; and
      merging, by the processor, the authorization request and the pseudo authorization message to create an enhanced authorization message.

* * * * *

UNITED STATES PATENT AND TRADEMARK OFFICE
CERTIFICATE OF CORRECTION

| | | |
|---|---|---|
| PATENT NO. | : 8,650,120 B2 | Page 1 of 1 |
| APPLICATION NO. | : 13/411370 | |
| DATED | : February 11, 2014 | |
| INVENTOR(S) | : Marcel Leyva et al. | |

It is certified that error appears in the above-identified patent and that said Letters Patent is hereby corrected as shown below:

In the Claims:

In Column 20, Line 23, Claim 17, after "hostname," please delete "N".

In Column 20, Line 61, Claim 20, please delete "computer based system" and insert therefor --processor--.

Signed and Sealed this
Twenty-ninth Day of April, 2014

Michelle K. Lee
*Deputy Director of the United States Patent and Trademark Office*